US010766620B2

(12) United States Patent
Castaing et al.

(10) Patent No.: US 10,766,620 B2
(45) Date of Patent: Sep. 8, 2020

(54) DEVICE FOR SUPPORTING A PORTABLE DEVICE FOR AN AEROPLANE SEAT

(71) Applicant: Safran Seats, Plaisir (FR)

(72) Inventors: Nathalie Castaing, Issoudun (FR);
Bastien Bonnefoy, Issoudun (FR);
Sébastien Ménard, Ambrault (FR);
Thierry Thavanaud, Issoudun (FR);
Jean-Pierre Monteiro, Le Subdray (FR)

(73) Assignee: Safran Seats, Plaisir (FR)

( * ) Notice: Subject to any disclaimer, the term of this patent is extended or adjusted under 35 U.S.C. 154(b) by 192 days.

(21) Appl. No.: 15/566,448

(22) PCT Filed: Apr. 5, 2016

(86) PCT No.: PCT/EP2016/057431
§ 371 (c)(1),
(2) Date: Oct. 13, 2017

(87) PCT Pub. No.: WO2016/165982
PCT Pub. Date: Oct. 20, 2016

(65) Prior Publication Data
US 2018/0118343 A1 May 3, 2018

Related U.S. Application Data

(60) Provisional application No. 62/146,674, filed on Apr. 13, 2015.

(51) Int. Cl.
*B60R 11/02* (2006.01)
*B64D 11/06* (2006.01)
(Continued)

(52) U.S. Cl.
CPC ........ *B64D 11/00152* (2014.12); *B60N 3/004* (2013.01); *B64D 11/0638* (2014.12);
(Continued)

(58) Field of Classification Search
CPC .. B60N 3/002; B60N 3/004; B64D 11/00152; B64D 11/0638; B60R 7/043;
(Continued)

(56) References Cited

U.S. PATENT DOCUMENTS 1,893,458 A * 1/1933 Tatum .................. B61D 33/00
297/146
2,619,395 A * 11/1952 Kent .................... B60N 3/004
108/38
(Continued)

FOREIGN PATENT DOCUMENTS

CN 204026084 12/2014
DE 202012007102 11/2012
(Continued)

OTHER PUBLICATIONS

International Patent Application No. PCT/EP2016/057431, Search Report (including translation) and Written Opinion (including translation), dated Jun. 17, 2016.

*Primary Examiner* — Kyle J. Walraed-Sullivan
(74) *Attorney, Agent, or Firm* — Kilpatrick Townsend & Stockt LLP

(57) ABSTRACT

The invention relates mainly to a seat intended to be installed in an aeroplane, having:
  a backrest having a front face against which a passenger is intended to lean, and a rear face on the opposite side from the front face,
  a tray, notably a retractable tray, known as a meal tray, positioned on the rear face of the backrest,
characterized in that said seat also has a device for supporting a portable screen, comprising a support element that is positioned on the rear face of the backrest and movable between a folded position and a deployed position in which it is able to support a portable device.

12 Claims, 4 Drawing Sheets

(51) Int. Cl.
*B60N 3/00* (2006.01)
*B64D 11/00* (2006.01)
*B60R 11/00* (2006.01)

(52) U.S. Cl.
CPC ........... *B60R 11/02* (2013.01); *B60R 11/0252* (2013.01); *B60R 2011/0015* (2013.01); *B60R 2011/0071* (2013.01)

(58) Field of Classification Search
CPC . B60R 11/0235; B60R 11/0252; B60R 11/02; B60R 2011/0015; B60R 2011/0075; B60R 2011/0071; A45C 2011/007
See application file for complete search history.

(56) References Cited

U.S. PATENT DOCUMENTS

| | | | | | |
|---|---|---|---|---|---|
| 3,795,422 | A * | 3/1974 | Robinson | ................. | A47C 7/70 297/146 |
| 4,681,366 | A * | 7/1987 | Lobanoff | ............... | B60N 2/879 297/188.06 |
| 6,427,959 | B1 * | 8/2002 | Kalis | ....................... | H04M 1/04 248/288.11 |
| 8,091,959 | B2 * | 1/2012 | Berger | ................... | B60R 11/00 108/134 |
| 8,561,863 | B2 * | 10/2013 | LaColla | ................. | B60R 11/02 224/275 |
| 10,308,362 | B2 * | 6/2019 | Trimble | ................ | B60N 3/004 |
| 10,562,635 | B2 * | 2/2020 | Colletti | ............. | B64D 11/0636 |
| 2006/0075934 | A1 * | 4/2006 | Ram | ................ | B64D 11/00155 108/44 |
| 2007/0283855 | A1 * | 12/2007 | Pozzi | ..................... | B60N 3/004 108/44 |
| 2008/0296821 | A1 * | 12/2008 | Carnevali | ................ | B25B 5/06 269/164 |
| 2009/0089841 | A1 * | 4/2009 | Hanlon | ................... | B60R 11/02 725/75 |
| 2009/0225238 | A1 * | 9/2009 | Vitito | .................. | B60R 11/0235 348/837 |
| 2011/0278885 | A1 * | 11/2011 | Procter | .............. | B60R 11/0235 297/135 |
| 2012/0120626 | A1 * | 5/2012 | Akaike | ................... | B60R 11/02 361/807 |
| 2012/0235001 | A1 * | 9/2012 | Somuah | ................. | B60R 11/0235 248/287.1 |
| 2012/0280014 | A1 * | 11/2012 | Lopez-Apodaca | ......................... | B60R 11/0241 224/539 |
| 2012/0312847 | A1 * | 12/2012 | LaColla | ................. | B60R 11/02 224/275 |
| 2013/0015687 | A1 * | 1/2013 | Kramer | .............. | B64D 11/0624 297/217.3 |
| 2013/0093220 | A1 * | 4/2013 | Pajic | ................. | B64D 11/0015 297/163 |
| 2013/0277520 | A1 * | 10/2013 | Funk | ..................... | G06F 1/1626 248/274.1 |
| 2014/0015289 | A1 * | 1/2014 | Fan | ........................ | B60N 3/004 297/188.05 |
| 2014/0042781 | A1 * | 2/2014 | Reeves | ................... | B60R 7/043 297/163 |
| 2014/0077539 | A1 * | 3/2014 | Brawner | ............. | B60R 11/0229 297/217.3 |
| 2014/0145050 | A1 * | 5/2014 | Hung | ..................... | F16M 13/00 248/274.1 |
| 2014/0263931 | A1 * | 9/2014 | Chen | ...................... | F16M 13/00 248/576 |
| 2015/0050077 | A1 * | 2/2015 | Huang | ................. | F16M 11/041 403/322.1 |
| 2015/0060624 | A1 * | 3/2015 | Huang | ................ | B60R 11/0241 248/316.4 |
| 2015/0108798 | A1 * | 4/2015 | Boyer, Jr. | .......... | B64D 11/0638 297/163 |
| 2015/0115009 | A1 * | 4/2015 | Stauber | .................... | B60R 11/02 224/275 |
| 2015/0122159 | A1 * | 5/2015 | Valcic | ..................... | B60N 3/004 108/26 |
| 2015/0123433 | A1 * | 5/2015 | Lamb, Jr. | ............ | B60R 11/0229 297/188.05 |
| 2015/0129724 | A1 * | 5/2015 | Kohmoto | ............... | F16M 13/00 248/52 |
| 2015/0175265 | A1 * | 6/2015 | Thiele | ..................... | B64D 11/06 297/188.04 |
| 2015/0192155 | A1 * | 7/2015 | Chen | ........................ | F16B 2/12 348/376 |
| 2015/0343957 | A1 * | 12/2015 | Narayanan | .............. | B60R 11/02 224/275 |
| 2016/0044805 | A1 * | 2/2016 | Fan | ........................ | B60R 11/02 232/4 R |
| 2016/0108942 | A1 * | 4/2016 | Yu | .............................. | F16B 2/12 248/316.4 |
| 2016/0114736 | A1 * | 4/2016 | Tranchina | .......... | B60R 11/0235 348/837 |
| 2016/0121772 | A1 * | 5/2016 | Stecko | .................... | B60R 7/043 108/25 |
| 2016/0143435 | A1 * | 5/2016 | Kim | ........................ | B60N 3/004 248/447.1 |
| 2016/0249073 | A1 * | 8/2016 | Margis | ............ | B64D 11/00152 |
| 2016/0257404 | A1 * | 9/2016 | Ferris | ............... | B64D 11/00152 |
| 2016/0355263 | A1 * | 12/2016 | Pozzi | ............... | B64D 11/00152 |
| 2016/0374215 | A1 * | 12/2016 | Danicich | ................ | F16C 11/04 |
| 2017/0028874 | A1 * | 2/2017 | Castaing | ............... | B64D 11/06 |
| 2017/0120840 | A1 * | 5/2017 | Harris | .................... | B60R 11/0229 |
| 2017/0174146 | A1 * | 6/2017 | Kipp | ..................... | B60R 11/02 |
| 2018/0065567 | A1 * | 3/2018 | Osterhoff | ................. | B60N 2/90 |
| 2018/0222400 | A1 * | 8/2018 | Neumann | ........ | B64D 11/00152 |
| 2018/0345874 | A1 * | 12/2018 | Thain | ................... | B60R 11/0241 |

FOREIGN PATENT DOCUMENTS

| | | |
|---|---|---|
| EP | 2746158 | 6/2014 |
| FR | 2982218 | 5/2013 |
| FR | 3009811 | 2/2015 |
| FR | 3009812 | 2/2015 |
| WO | 2012118096 | 9/2012 |
| WO | 2015010123 | 1/2015 |

* cited by examiner

DEVICE FOR SUPPORTING A PORTABLE DEVICE FOR AN AEROPLANE SEAT

CROSS REFERENCE TO RELATED APPLICATIONS

This patent application is the U.S. national stage entry of PCT/EP2016/057431, filed Apr. 5, 2016, which application claims the benefit of U.S. Provisional Application No. 62/146,674, filed Apr. 13, 2015 and entitled TABLET HOLDER, both of which are incorporated in their entireties by this reference.

The present invention relates to a device for supporting a portable device, notably a video screen or a digital tablet, for an aeroplane seat. The invention finds a particularly advantageous, but not exclusive, application with economy class airplane seats.

In a manner known per se, economy class seats have a seat part, a backrest and a retractable tray arranged on a rear face of the backrest.

These seats are not generally equipped with a multimedia system. Consequently, in order to benefit from video or music content, a passenger has to use his multimedia screen, for example a portable screen or a digital tablet, and place it on the retractable tray of the seat, known as the meal tray. This has the drawback of cluttering up the meal tray, which then has less available space for supporting other objects. Moreover, the positioning of the portable screen or a digital tablet is not optimum in terms of viewing comfort since the meal tray is not intended for this purpose.

The invention aims to effectively remedy this drawback by proposing a seat intended to be installed in an aeroplane, having:
- a backrest having a front face, against which a passenger is intended to lean, and a rear face on the opposite side from the front face,
- a tray, notably a retractable tray, known as a meal tray, positioned on the rear face of the backrest, characterized in that the seat also has a device for supporting a portable device, comprising a support element that is positioned on the rear face of the backrest and movable between a folded position and a deployed position in which it is able to support the portable device.

The invention thus makes it possible for the passenger to be able to set up a personal portable screen on a dedicated support belonging to a seat that does not normally have a multimedia system and thus to benefit comfortably from its video and audio content.

According to one embodiment, the support element is mounted so as to rotate with respect to the backrest, in particular about a hinge.

According to one embodiment, the hinge is carried on a lower side of a seat cover.

According to one embodiment, the hinge is a leaf spring hinge or a friction hinge.

According to one embodiment, the support element has at least one retaining means for the portable device.

According to one embodiment, the retaining means has at least one groove. This allows the lower edge of the screen to be supported.

According to one embodiment, the retaining means has a plurality of parallel grooves that extend alongside one another. This allows the inclination angle of the screen to be adjusted.

According to one embodiment, the supporting device also has a supporting element configured to support an upper edge of the portable device. This allows the two opposite edges of the screen to be supported.

According to one embodiment, the supporting element is mounted on a base, which is notably movable in translation with respect to a fixed portion of the backrest.

According to one embodiment, the supporting device has a clamping device.

According to one embodiment, the clamping device has an elastic strap positioned around a first protuberance formed on the base and a second protuberance formed on the fixed portion of the backrest.

According to one embodiment, the seat has a shock absorbing device, notably provided with an element made of an elastic material, in particular positioned inside a cavity that extends between the base and the fixed portion. This makes it possible to cushion the impact when the hook returns to its initial position once the elastic strap has been released.

According to one embodiment, in the folded position, the support element is covered by the meal tray in the stowed position.

Of course, the various characteristics, variants and/or embodiments of the present invention can be associated with one another in different combinations inasmuch as they are not incompatible or exclusive with respect to one another.

The present invention will be understood better and further features and advantages will become more apparent from reading the following detailed description comprising embodiments given by way of illustration with reference to the appended figures, which are presented by way of non-limiting examples and may serve to further the understanding of the present invention and explain how it is embodied and, where appropriate, help to define it, and in which.

It should be noted that, in the figures, the structural and/or functional elements that are common to the different embodiments can have the same references. Thus, unless stated otherwise, such elements have identical structural, dimensional and material properties.

Figure 1A:
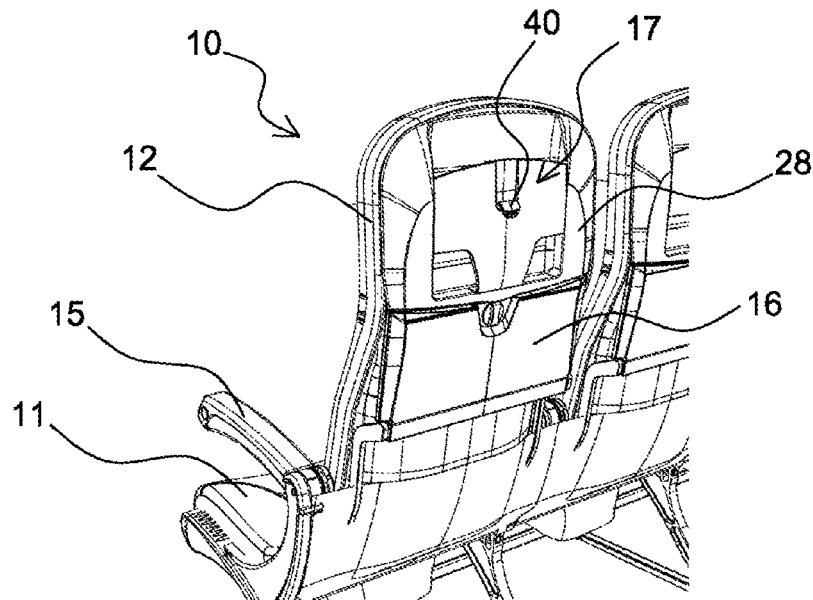
FIG. 1a is a perspective view of a seat having a supporting device according to the present invention.

FIG. 1a shows a seat 10 intended to be installed in an aeroplane. The seat 10 has a seat part 11 and a backrest 12. The backrest 12 has a front face, against which the passenger is intended to lean, and a rear face on the opposite side from the front face. The backrest 12 may be articulated with respect to the seat part 11 in order to take up inclined positions. Armrests 15, notably lifting armrests, are situated on either side of the seat 10.

A tray 16, preferably a retractable tray, known as a meal tray, is positioned on the side of the rear face of the backrest 12. The meal tray 16 is able to take up a stowed position, as shown in FIG. 1a in which the meal tray 16 is pressed against the rear face of the backrest 12, and a deployed position, as shown in FIG. 1b, in which the meal tray 16 extends, advantageously horizontally, in order to be able to support objects placed thereon by the passenger.

Moreover, as is clearly visible in FIGS. 1a to 1d, the seat 10 has a supporting device 17, notably intended to receive a portable device 21. The supporting device 17 comprises at least one support element 20 positioned on the rear face of the backrest 12 and a supporting element 40 configured to support an upper edge of the portable device 21. The portable device 21 can thus be held between the screen support element 20 and the supporting element 40.

Figure 1B:
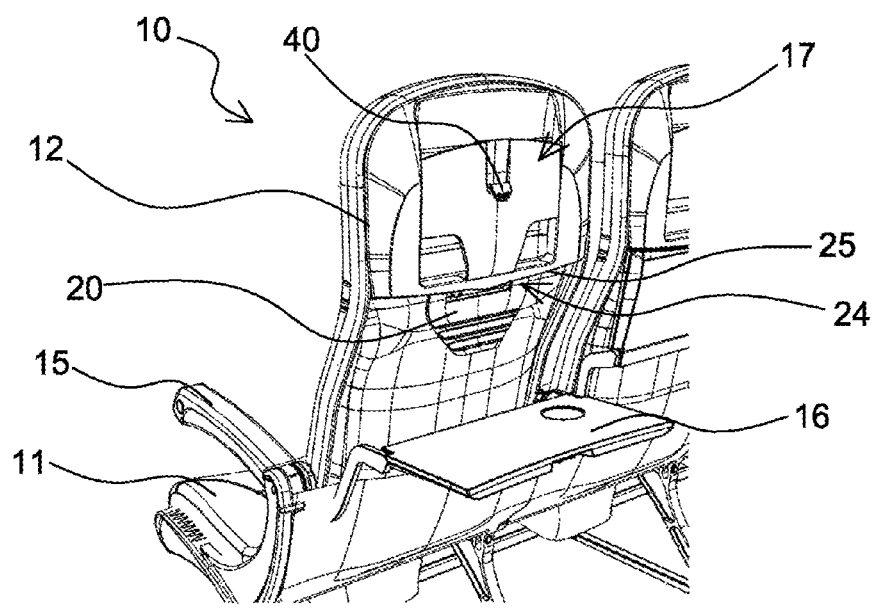
FIGS. 1b and 1c are perspective views illustrating a folded position and a deployed position, respectively, of the supporting device according to the invention.
Figure 1C:
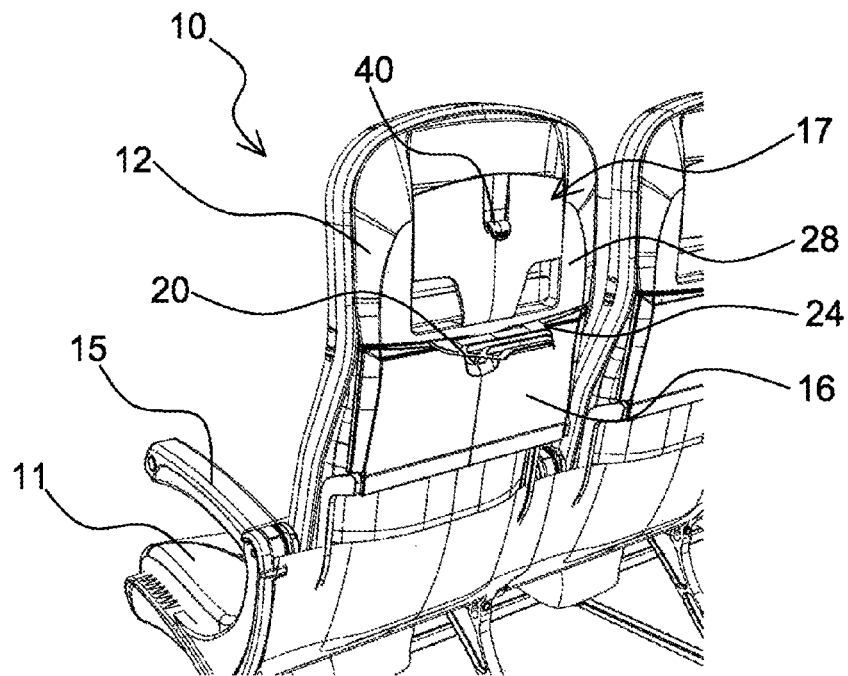
Figure 1D:
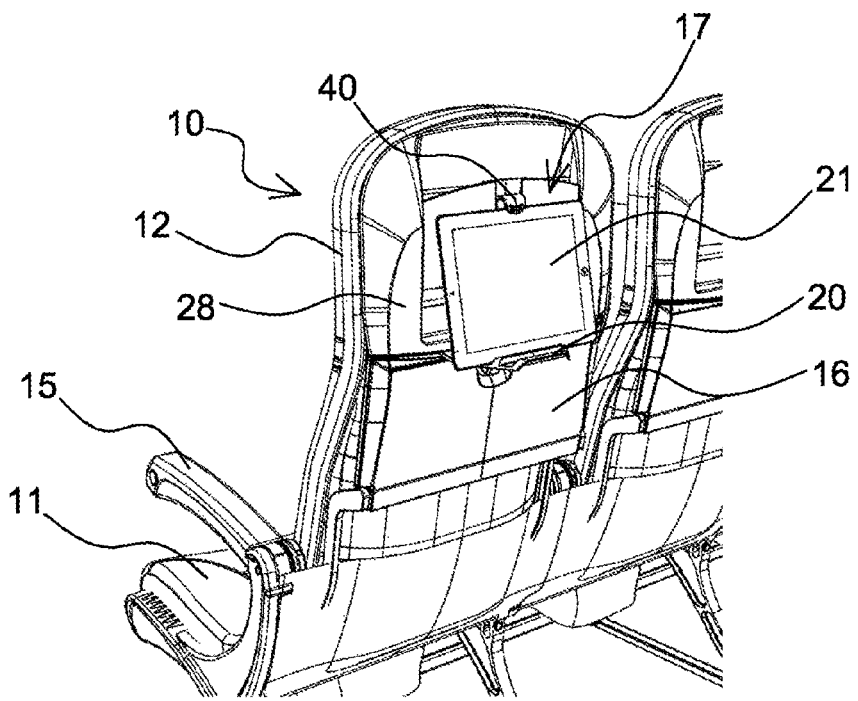
FIG. 1d is a perspective view illustrating the positioning of a portable device on the supporting device according to the present invention.

More specifically, according to a particular variant embodiment, the support element 20 is movable between a folded position, as shown in FIG. 1b, in which the support element 20 is pressed against the rear face of the seat 10, and a deployed position, as shown in FIGS. 1c and 1d, in which the support element 20 is able to support the portable device 21. The support element 20 may for example be in the form of a trapezoidal plate.

In order to be moved from the folded position to the deployed position, the support element 20 is mounted so as to rotate with respect to the backrest 12, notably by virtue of a hinge 24. The hinge 24 is carried on a lower side 25 of a seat cover 28, extending preferably in the top part of the backrest 12. Alternatively, the hinge is fixed directly to the structure of the backrest 12.

Figure 4:
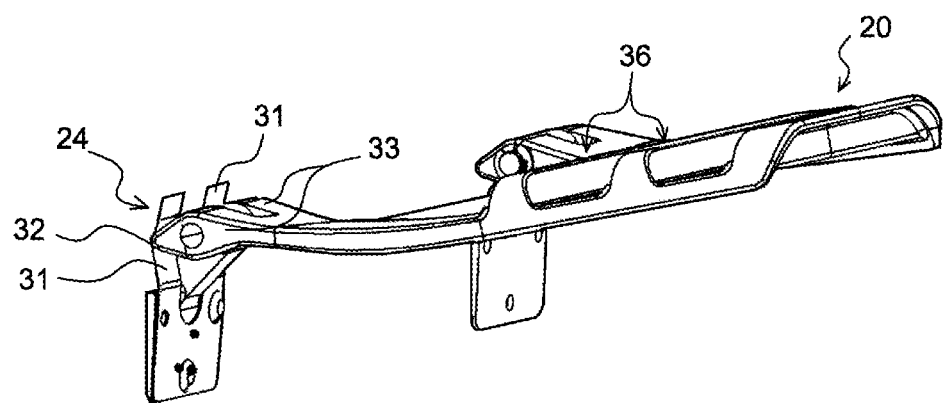
FIG. 4 is a detailed perspective view of a hinge of the supporting device according to the present invention.

According to one particular exemplary embodiment, the hinge 24 is preferably a leaf spring hinge, as is illustrated in FIG. 4. In this case, the hinge 24 has at least one arm 31, which is advantageously deformable. Alternatively, the hinge 24 two deformable arms 31 disposed on each side of the support element 20.

According to the exemplary embodiment presented, the arm 31 is provided with a curved shape 32 intended to receive a corresponding end of a lug 33 projecting from an edge of the support element 20. Alternatively, the hinge 24 is a friction hinge. In addition or alternatively, a locking member, consisting for example of a catch, supports the support element 20 in the deployed position.

Figure 2:
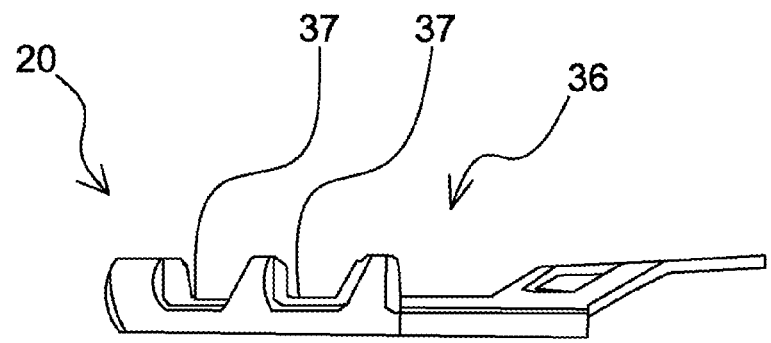
FIG. 2 is a detailed view of a retaining device for the supporting device according to the present invention.

In order to keep the lower edge of the portable device 21 in position, the support element 20 has at least one retaining means 36, which can be seen in FIG. 2. Specifically, the retaining means 36 has at least one groove 37, advantageously a plurality of parallel grooves 37 extending alongside one another. An arrangement having a plurality of grooves 37 makes it possible to adjust the inclination angle of the portable device 21. Alternatively or in addition, it will be possible to use a strip of nonslip material.

Figure 3:
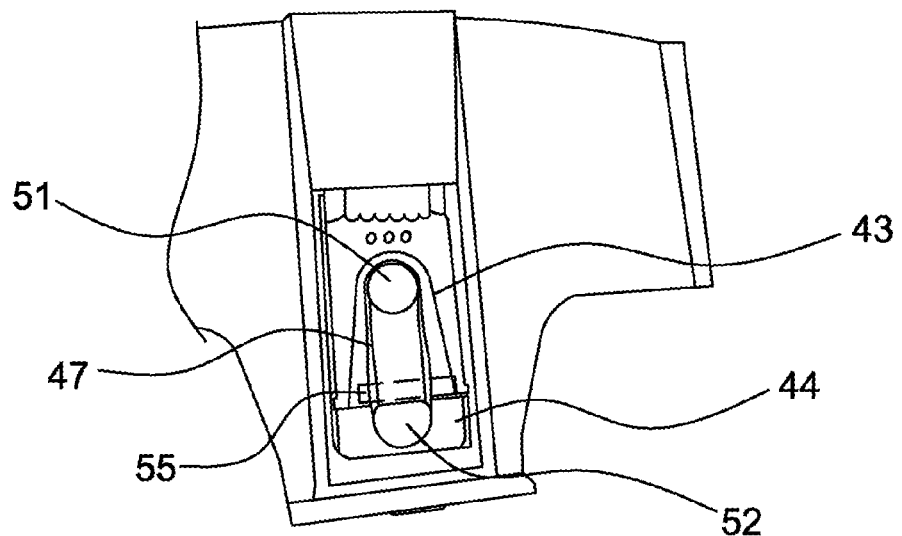
FIG. 3 is a view illustrating a strap system that allows a supporting element according to the invention to be moved in translation.

Furthermore, as can be seen in FIG. 3, the supporting element 40 is mounted on a base 43. The supporting element 40 may for example be in the form of an open hook on the side of the support element 20. Preferably, the base 43 is movable in translation with respect to a fixed portion 44 of the backrest 12 in order to be able to adapt to the dimensions of the portable device 21. The fixed portion 44 of the backrest 12 may consist of a plate forming a document holder on the seat cover 28. Preferably, the base 43 is movable in a vertical direction of extension of the backrest 12.

Moreover, the supporting device 17 has a clamping device 45 that is able to allow the application of a clamping force. More particularly, the clamping device 45 comprises an elastic strap 47 that is positioned around a first protuberance 51 formed in the movable base 43 and a second protuberance 52 formed in the fixed portion 44 of the backrest 12. Alternatively, the clamping device 45 consists of a spring connected to the base 43 on one side and to the fixed portion 44 on the other.

The supporting element 40 may also be made of a flexible material in order to adapt to the dimensions of the portable device 21.

According to one variant embodiment, the supporting device 17 comprises a shock absorbing device 55. For example, the shock absorbing device 55 is provided with an element made of an elastic material, notably an elastomer material. Preferably, the shock absorbing device 55 is positioned inside a cavity that extends between the base 43 and the fixed portion 44 of the backrest 12.

The deployment of the supporting device 17 in order to allow the positioning of the portable device 21 will be described below with reference to FIGS. 1a to 1d. As is illustrated in FIG. 1a, when the support element 20 is in the folded position, said support element 20 is advantageously covered by the meal tray 16 in the stowed position. In order to access the support element 20, the passenger thus moves the meal tray 16 into the deployed position, as shown in FIG. 1b. The passenger can then move the support element 20 from the folded position to the deployed position, and then return the meal tray 16 into the stowed position, if he does not need it, as shown in FIG. 1c.

For portable devices having dimensions greater than the distance between the supporting element 40 and the support element 20, for example when the elastic strap 47 is not under stress, the passenger moves the supporting element 40 away from the support element 20 and positions the portable device 21 on the support element 20 such that the lower edge of the portable device 21 is inserted into the groove or one of the grooves 37. The passenger can then release the supporting element 40, which bears against an upper edge of the portable device 21. The portable device 21 is thus clamped between the support element 20 and the supporting element 40 by virtue of the clamping force applied by the clamping device 45, for example the elastic strap 47 under stress.

For portable devices 21 having dimensions smaller than the distance between the supporting element 40 and the support element 20, the portable device 21 rests only on the support element 20 with the upper edge of the portable device 21 bearing against the rear face of the backrest 12. The portable device 21 is thus unrestricted by the supporting element 40. The supporting element 40 is therefore not an essential element of the supporting device 17, which may lack said support element 40 in certain simplified embodiments of the invention.

Of course, the invention is not limited to the above-described embodiments that are provided only by way of example. It encompasses various modifications, alternative forms and other variants which a person skilled in the art may envision within the scope of the present invention and notably any combinations of the various above-described embodiments, which can be considered separately or in combination.

The invention claimed is:

1. A seat intended to be installed in an aeroplane, having:
   a backrest having a front face and a rear face opposite the front face;
   a retractable tray positioned on the rear face of the backrest having a deployed position and a retracted position;
   a supporting device for supporting a portable device, wherein the supporting device comprises a support element having a bottom surface and a top surface;
   wherein the support element is rotatable between a stowed position and a deployed position;

wherein, in the stowed position, the support element is positioned vertically along the rear face of the backrest such that the bottom surface faces towards the backrest and the top surface faces away from the backrest; and wherein, in the deployed position, the support element is positioned horizontally such that the support element is substantially perpendicular to the backrest and the bottom surface faces downward and the top surface faces upward such that a bottom end of the portable device contacts the top surface; and wherein, in the stowed position, the support element is covered by the retractable tray with the retractable tray in the retracted position, and wherein the retractable tray is configured to be rotatable from the deployed position to the retracted position while the support element remains in the deployed position.

2. The seat as claimed in claim 1, wherein the support element is mounted so as to rotate with respect to the backrest about a hinge.

3. The seat as claimed in claim 2, wherein the hinge is positioned on a lower side of a seat cover.

4. The seat as claimed in claim 2, wherein the hinge comprises a leaf spring hinge or a friction hinge.

5. The seat as claimed in of claim 1, wherein the support element has at least one retaining means for retaining the portable device.

6. The seat as claimed in claim 5, wherein the at least one retaining means has at least one groove.

7. The seat as claimed in claim 6, wherein the at least one retaining means has a plurality of parallel grooves that extend alongside one another.

8. The seat as claimed in claim 1, wherein the supporting device further comprises an upper supporting element configured to support an upper edge of the portable device.

9. The seat as claimed in claim 8, wherein the upper supporting element is mounted on a base and is movable in translation with respect to a fixed portion of the backrest.

10. The seat as claimed in claim 9, wherein the upper supporting element has a clamping device.

11. The seat as claimed in claim 10, wherein the clamping device has an elastic strap positioned around a first protuberance formed on the base and a second protuberance formed on the fixed portion of the backrest.

12. The seat as claimed in claim 11, further comprising a shock absorbing device including an element made of an elastic material, wherein the element is positioned inside a cavity that extends between the base and the fixed portion.

* * * * *